US008019350B2

(12) United States Patent
Purnhagen et al.

(10) Patent No.: US 8,019,350 B2
(45) Date of Patent: Sep. 13, 2011

(54) AUDIO CODING USING DE-CORRELATED SIGNALS

(75) Inventors: Heiko Purnhagen, Stockholm (SE); Jonas Engdegard, Stockholm (SE); Jeroen Breebaart, Eindhoven (NL); Erik Schuijers, Eindhoven (NL)

(73) Assignees: Coding Technologies AB, Stockholm (SE); Koninklijke Philips Electronics, N.V., Eindhoven (NL)

( * ) Notice: Subject to any disclaimer, the term of this patent is extended or adjusted under 35 U.S.C. 154(b) by 942 days.

(21) Appl. No.: 11/291,009

(22) Filed: Nov. 29, 2005

(65) Prior Publication Data

US 2006/0165184 A1 Jul. 27, 2006

Related U.S. Application Data

(63) Continuation of application No. PCT/EP2005/011664, filed on Oct. 31, 2005.

(30) Foreign Application Priority Data

Nov. 2, 2004 (SE) ....................................... 0402649

(51) Int. Cl.
*H04W 72/00* (2009.01)
*H04R 5/00* (2006.01)

(52) U.S. Cl. .......................................... 455/450; 381/17

(58) Field of Classification Search .................. 455/450, 455/451; 704/219, 215, 500; 381/17, 18, 381/12, 20, 55

See application file for complete search history.

(56) References Cited

U.S. PATENT DOCUMENTS

| | | | | |
|---|---|---|---|---|
| 5,706,309 | A | 1/1998 | Eberlein et al. | |
| 7,272,555 | B2 * | 9/2007 | Lee et al. | 704/219 |
| 2002/0067834 | A1 | 6/2002 | Shirayanagi | |

FOREIGN PATENT DOCUMENTS

| | | | |
|---|---|---|---|
| EP | 0574145 | | 12/1993 |
| TW | 530296 | B | 5/2003 |
| TW | 563094 | B | 11/2003 |
| WO | WO 95/26083 | | 9/1995 |
| WO | WO 99/26455 | | 5/1999 |
| WO | WO 2005/101370 | | 10/2005 |

OTHER PUBLICATIONS

Potard et al, Decorrelation techniques for the rendering of apparrent sound source width in 3D audio displays, School of electrical, computer and telecommunications engineering university of Wollong, Wollong, Astralia; pp. 280-282.*

(Continued)

*Primary Examiner* — George Eng
*Assistant Examiner* — Michael Faragalla
(74) *Attorney, Agent, or Firm* — Michael A. Glenn; Glenn Patent Group

(57) ABSTRACT

A multi-channel signal having at least three channels can be reconstructed such, that the reconstructed channels are at least partly de-correlated from each other using a downmixed signal derived from an original multi-channel signal and a set of de-correlated signals provided by a de-correlator (101) that derives the set of de-correlated signals from the down-mix signal, wherein the de-correlated signals within the set of de-correlated signals are mutually mostly orthogonal to each other, i.e. an orthogonality relation between channel pairs is satisfied within an orthogonality tolerance range.

19 Claims, 10 Drawing Sheets

OTHER PUBLICATIONS

Faller, et al. Binaural Cue Coding Applied to Stereo and Multi-Channel Audio Compression. Audio Engineering Society Convention Paper 5574. 112th Convention. May 10-13, 2002. Munich, Germany.

Baumgarte, et al. Estimation of Auditory Spatial Cues for Binaural Cue Coding. IEEE. 2002.

Faller, et al. Binaural Cue Coding: A Novel and Efficient Representation of Spatial Audio. IEEE. 2002.

Breebaart, et al. EURASIP Journal on Applied Signal Processing Sep. 2005. 1305-1322. 2005.

Schuijers, et al. Low complexity Parametric Stereo Coding. Audio Engineering Society Convention Paper 6073. 116th Convention. May 8-11, 2004. Berlin, Germany.

Breebaart, et al. High-quality Parametric Spatial Audio Coding at Low Bit Rates. Audio Engineering Society Convention Paper. 116th Convention. May 8-11, 2004. Berlin, Germany.

Potard, et al. Decorrelation Techniques for the Rendering of Apparent Sound Source Width in 3D Audio Displays. Proc. of the 7th Int. Conference on Digital Audio Effects (DAFx'04). Naples, Italy. Oct. 5-8, 2004.

Kendall, G. The Decorrelation of Audio Signals and Its Impact on Spatial Imagery. Computer Music Journal. 19:4. Winter 1995.

* cited by examiner

AUDIO CODING USING DE-CORRELATED SIGNALS

CROSS-REFERENCE TO RELATED APPLICATIONS

This application is a continuation of co-pending International application No. PCT/EP2005/011664, filed Oct. 31, 2005, which designated the United States and was not published in English.

BACKGROUND OF THE INVENTION

1. Field of the Invention

The present invention relates to coding of multi-channel audio signals using spatial parameters and in particular to new improved concepts for generating and using de-correlated signals.

2. Description of the Related Art

Recently, multi-channel audio reproduction techniques are becoming more and more important. In the view of an efficient transmission of multi-channel audio signals having 5 or more separate audio channels, several ways of compressing a stereo or multi-channel signal have been developed. Recent approaches for the parametric coding of multi-channel audio signals (parametric stereo (PS), "Binaural Cue Coding" (BCC) etc.) represent a multi-channel audio signal by means of a down-mix signal (could be monophonic or comprise several channels) and parametric side information, also referred to as "spatial cues", characterizing its perceived spatial sound stage.

A multi-channel encoding device generally receives—as input—at least two channels, and outputs one or more carrier channels and parametric data. The parametric data is derived such that, in a decoder, an approximation of the original multi-channel signal can be calculated. Normally, the carrier channel (channels) will include sub-band samples, spectral coefficients, time domain samples, etc., which provide a comparatively fine representation of the underlying signal, while the parametric data do not include such samples of spectral coefficients but include control parameters for controlling a certain reconstruction algorithm instead. Such a reconstruction could comprise weighting by multiplication, time shifting, frequency shifting, phase shifting, etc. Thus, the parametric data includes only a comparatively coarse representation of the signal or the associated channel.

The binaural cue coding (BCC) technique is described in a number of publications, as in "Binaural Cue Coding applied to Stereo and Multi-Channel Audio Compression", C. Faller, F. Baumgarte, AES convention paper 5574, May 2002, Munich, in the 2 ICASSP publications "Estimation of auditory spatial cues for binaural cue coding", and "Binaural cue coding: a normal and efficient representation of spatial audio", both authored by C. Faller, and F. Baumgarte, Orlando, Fla., May 2002.

In BCC encoding, a number of audio input channels are converted to a spectral representation using a DFT (Discrete Fourier Transform) based transform with overlapping windows. The resulting uniform spectrum is then divided into non-overlapping partitions. Each partition has a bandwidth proportional to the equivalent rectangular bandwidth (ERB). Then, spatial parameters called ICLD (Inter-Channel Level Difference) and ICTD (Inter-Channel Time Difference) are estimated for each partition. The ICLD parameter describes a level difference between two channels and the ICTD parameter describes the time difference (phase shift) between two signals of different channels. The level differences and the time differences are normally given for each channel with respect to a reference channel. After the derivation of these parameters, the parameters are quantized and finally encoded for transmission.

Although ICLD and ICTD parameters represent the most important sound source localization parameters, a spatial representation using these parameters can be enhanced by introducing additional parameters.

A related technique, called "parametric stereo" describes the parametric coding of a two-channel stereo signal based on a transmitted mono signal plus parameter side information. In this context, 3 types of spatial parameters, referred to as inter-channel intensity difference (IIDs), inter-channel phase differences (IPDs), and inter-channel coherence (ICC) are introduced. The extension of the spatial parameter set with a coherence parameter (correlation parameter) enables a parametrization of the perceived spatial "diffuseness" or spatial "compactness" of the sound stage. Parametric stereo is described in more detail in: "Parametric Coding of stereo audio", J. Breebaart, S. van de Par, A. Kohlrausch, E. Schuijers (2005) Eurasip, J. Applied Signal Proc. 9, pages 1305-1322)", in "High-Quality Parametric Spatial Audio Coding at Low Bitrates", J. Breebaart, S. van de Par, A. Kohlrausch, E. Schuijers, AES 116$^{th}$ Convention, Preprint 6072, Berlin, May 2004, and in "Low Complexity Parametric Stereo Coding", E. Schuijers, J. Breebaart, H. Purnhagen, J. Engdegard, AES 116$^{th}$ Convention, Preprint 6073, Berlin, May 2004.

The present invention relates to parametric coding of the spatial properties of an audio signal. Parametric multi-channel audio decoders reconstruct N channels based on M transmitted channels, where N>M, and additional control data. The additional control data represents a significant lower data rate than transmitting all N channels, making the coding very efficient while at the same time ensuring compatibility with at least both M channel devices and N. channel devices. Typical parameters used for describing spatial properties are inter-channel intensity differences (IID), inter-channel time differences (ITD), and inter-channel coherences (ICC). In order to reconstruct the spatial properties based on these parameters, a method is required that can reconstruct the correct level of correlation between two or more channels, according to the IC parameters. This is accomplished by means of a de-correlation method, i.e. a method to derive decorrelated signals from transmitted signals to combine decorrelated signals with transmitted signals within some upmixing process. Methods for upmixing based on a transmitted signal, a decorrelated signal, and IID/ICC parameters is described in the references given above.

There are a couple of methods available for creation of decorrelated signals. Preferably, the decorrelated signals have similar or equal temporal and spectral envelopes as the original input signals. Ideally, a linear time invariant (LTI) function with all-pass frequency response is desired. One obvious method for achieving this is by using a constant delay. However, using a delay, or any other LTI all-pass function, will result in non-all-pass response after addition of the non-processed signal. In the case of a delay, the result will be a typical comb-filter. The comb-filter often gives an undesirable "metallic" sound that, even if the stereo widening effect can be efficient, reduces much naturalness of the original. The constant delay method and other prior art methods suffer from the inability to create more than one de-correlated signal while preserving quality and mutual de-correlation.

The perceptual quality of a reconstructed multi-channel audio signal therefore depends strongly on an efficient concept that allows for the generation of a de-correlated signal from a transmitted signal, wherein ideally the de-correlated signal is orthogonal to the signal from which it is derived, i.e. perfectly de-correlated. Even if a perfectly de-correlated signal is available, a multi-channel upmix in which the individual channels are mutually de-correlated cannot be derived using a single de-correlated signal. During the upmixing a reconstructed audio channel is generated by combining a transmitted signal with the generated de-correlated signal, whereas the extent to which the de-correlated signal is mixed to the transmitted signal is typically controlled by a transmitted spatial audio parameter (ICC). Mutually perfectly de-correlated signals can therefore not be achieved, since every reconstructed audio channel has a fraction of the same de-correlated signal.

SUMMARY OF THE INVENTION

It is the object of the present invention to provide a more efficient concept for creation of highly de-correlated signals.

In accordance with a first aspect, the present invention provides a multi-channel decoder for generating a reconstruction of a multi-channel signal using a downmix signal derived from an original multi-channel signal, the reconstruction of the multi-channel signal having at least three channels, having a de-correlator for deriving a set of de-correlated signals using a de-correlation rule, wherein the de-correlation rule is such that a first de-correlated signal and a second de-correlated signal are derived using the downmix signal, and that the first de-correlated signal and the second de-correlated signal are orthogonal to each other within an orthogonality tolerance range; and an output channel calculator for generating output channels using the downmix signal, the first and the second de-correlated signals and upmix information so that the at least three channels are at least partly de-correlated from each other.

In accordance with a second aspect, the present invention provides a method of generating a reconstruction of a multi-channel signal using a downmix signal derived from an original multi-channel signal, the reconstruction of the multi-channel signal having at least three channels, the method having the steps of deriving a set of de-correlated signals using a de-correlation rule, wherein the de-correlation rule is such that the first de-correlated signal and the second de-correlated signal are derived using the downmix signal and that the first de-correlated signal and the second de-correlated signal are orthogonal to each other within an orthogonality tolerance range; and generating output channels using the downmix signal, the first and the second de-correlation signals and upmix information so that the at least three channels are at least partly de-correlated from each other.

In accordance with a third aspect, the present invention provides a reconstructed multi-channel signal having at least three channels, the reconstructed multi-channel signal being reconstructed using a downmix signal derived from an original multi-channel signal and a first de-correlated signal and a second de-correlated signal derived using the downmix signal, wherein the first de-correlated signal and the second de-correlated signal are orthogonal to each other within an orthogonality tolerance range.

In accordance with a fourth aspect, the present invention provides a computer-readable storage medium having stored thereon a reconstructed multi-channel signal in accordance with the above mentioned signal.

In accordance with a fifth aspect, the present invention provides a receiver or audio player, the receiver or audio player having a multi-channel decoder in accordance with the above mentioned decoder.

In accordance with a sixth aspect, the present invention provides a method of receiving or audio playing, the method having a method for generating a reconstruction of a multi-channel signal in accordance with the above mentioned method.

In accordance with a seventh aspect, the present invention provides a computer program for performing, when running on a computer, a method in accordance with any of the above mentioned methods.

The present invention is based on the finding that a multi-channel signal having at least three channels can be reconstructed such that the reconstructed channels are at least partly de-correlated from each other using a downmixed signal derived from an original multi-channel signal and a set of decorrelated signals provided by a de-correlator that derives the set of de-correlated signals from the downmix signal, wherein the de-correlated signals within the set of de-correlated signals are mutually approximately orthogonal to each other, i.e. an orthogonality relation between channel pairs is satisfied within an orthogonality tolerance range.

An orthogonality tolerance range can for example be derived from the cross correlation coefficient that quantifies the 20 degree of correlation between two signals. A cross correlation coefficient of 1 means perfect correlation, i.e. two identical signals. On the other and, a cross correlation coefficient of 0 means perfect anticorrelation or orthogonality of the signals. The orthogonality tolerance range, therefore, may be defined as interval of correlation coefficient values ranging from 0 to a specific upper limit.

Hence, the present invention relates to, and provides a solution to, the problem of efficiently generating one or more orthogonal signals while preserving impulse properties and perceived audio quality.

In one embodiment of the present invention an IIR lattice filter is implemented as a de-correlator having filter-coefficients derived from noise sequences, and the filtering is performed within a complex valued or real valued filter bank.

In one embodiment of the present invention, a method for reconstructing a multi-channel signal includes a method for creating several orthogonal or close to orthogonal signals by using a group of lattice IIR filters.

In a further embodiment of the present invention, the method for creating several orthogonal signals is having a method for choosing filter coefficients for achieving orthogonality or an approximation of orthogonality in a perceptually motivated way.

In a further embodiment of the present invention, a group of lattice IIR filters is used within a complex valued filter-bank during the reconstruction of the multi-channel signal.

In a further embodiment of the present invention a method for creating one or more orthogonal or close to orthogonal signals is implemented, using one or more all-pass IIR filters based on lattice structure within in a spatial decoder.

In a further embodiment of the present invention, the embodiment described above is implemented such that the filter coefficients used for the IIR filtering are based on random noise sequences.

In a further embodiment of the present invention, additional time delays are added to the filters used.

In a further embodiment of the present invention, the filtering is processed in a filterbank domain.

In a further embodiment of the present invention, the filtering is processed in a complex valued filterbank.

In a further embodiment of the present invention, the orthogonal signals created by the filtering are mixed to form a set of output signals.

In a further embodiment of the present invention, the mixing of the orthogonal signals is depending on transmitted control data, additionally supplied to an inventive decoder.

In a further embodiment of the present invention, an inventive decoder or an inventive decoding method uses control data that contains at least one parameter indicating a desired cross-correlation of at least two of the output signals generated.

In a further embodiment of the present invention, a 5.1 channel surround signal is upmixed from a transmitted monophonic signal by deriving four de-correlated signals using the inventive concept. The monophonic downmixed signal and the four de-correlated signals are then mixed together according to some mixing rules to form the output 5.1 channel signal. Therefore the possibility is provided to generate output signals that are mutually de-correlated, since the signals used for the upmix, i.e. the transmitted monophonic signal and the four generated de-correlated signals are mainly de-correlated due to their inventive generation.

In a further embodiment of the present invention, two individual channels are transmitted as a downmix of a 5.1 channel signal. In one implementation, two additional mutually de-correlated signals are derived using the inventive concept to provide four channels as basis for an upmix which are almost perfectly de-correlated. In a modification of the embodiment described above a third de-correlated signal is derived and mixed with the other two de-correlated signals to provide a further de-correlated signal available for the subsequent upmixing. Using this feature, the perceptual quality can be further enhanced for individual channels, e.g. the center-channel of a 5.1 surround signal.

In a further embodiment of the present invention, five audio channels are upmixed from a monophonic transmitted channel prior to deriving, using the inventive concept, four de-correlated signals that are subsequently combined with four of the five aforementioned upmixed channels, allowing for a creation of five output audio channels that are mutually mainly de-correlated.

In a further embodiment of the present invention, the audio signals are delayed prior to or after the application of the inventive. IIR filter based filtering. The delay further enhances the de-correlation of the generated signals, and reduces colorization when mixing the generated de-correlated signals with the original downmixed signal.

In a further embodiment of the present invention, the generation of the de-correlated signals is performed in the sub-band domain of a (complex modulated) filterbank, wherein the filter coefficients used by the de-correlator are derived using the specific filterbank index of the filterbank for which the de-correlated signals are derived.

In a further embodiment of the present invention, the de-correlated signals are derived using lattice IIR filters that perform a lattice IIR all-pass filtering of an audio signal. Using a lattice IIR filter has major advantages. An exponential decay of the response of such a filter, which is preferable for creating appropriate decorrelated signals, is an inherent property of such a filter. Furthermore, a desired long decaying pulse response of a filter used to generate decorrelated signals can be achieved in an extremely memory and computationally efficient (low complexity) manner by using a lattice filter structure.

In a modification of the previously described embodiment the filter coefficients (reflection coefficients) used are given by means of providing filter coefficients derived from noise sequences. In a modification, the reflection coefficients are individually calculated based on the sub-band index of a sub-band, in which the lattice filter is used to derive de-correlated signals.

In one embodiment of the present invention, the filtered signals and the unmodified input signal are combined by a mixing matrix D to form a set of output signals. The mixing matrix D defines the mutual correlations of the output signals, as well as the energy of each output signal. The entries (weights) of the mixing matrix D are preferably time-variable and dependent on transmitted control data. The control parameters preferably contain (desired) level differences between certain output signals and/or specific mutual correlation parameters.

In a further embodiment of the present invention, an inventive audio decoder is comprised within an audio receiver or playback device to enhance the perceptual quality of a reconstructed signal.

BRIEF DESCRIPTION OF THE DRAWINGS

Preferred embodiments of the present invention are explained in more detail in the following with reference to the accompanying drawings, in which.

DESCRIPTION OF THE PREFERRED EMBODIMENTS

The embodiments described below are merely illustrative for the principles of the present invention for advanced methods for creating orthogonal signals. It is understood that modifications and variations of the arrangements and the details described herein will be apparent to those skilled in the art. It is the intent, therefore, to be limited only by the scope of the impending patent claims and not by the specific details presented by way of description and explanation of the embodiments herein.

Figure 1:
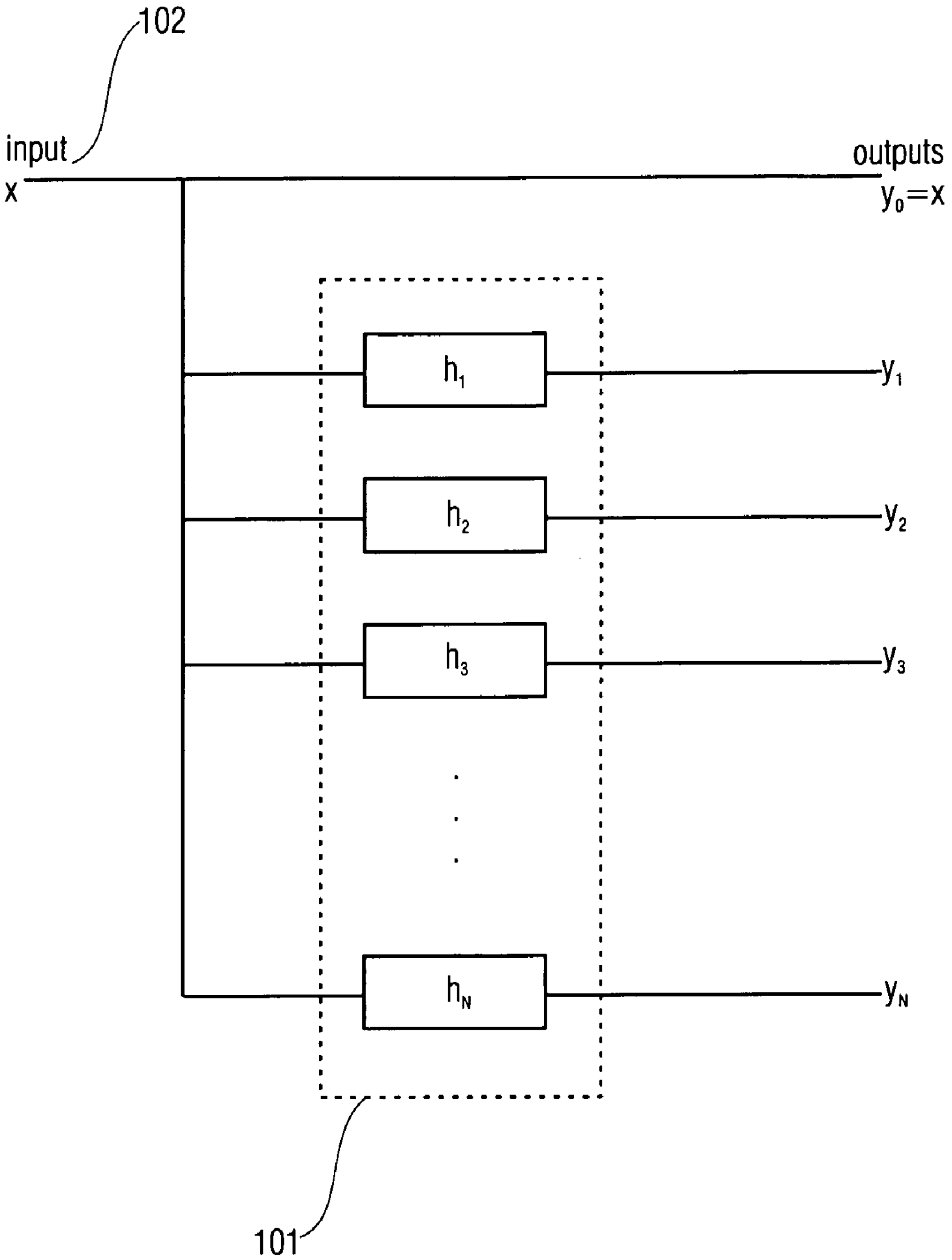
FIG. 1 shows a block diagram of the inventive audio decoding concepts.

FIG. 1 illustrates an inventive apparatus for the de-correlation of signals as used in a parametric stereo or multi-channel system. The inventive apparatus includes means 101 for providing a plurality of orthogonal de-correlated signals derived from an input signal 102. The providing means can be an array of de-correlation filters based on lattice IIR structures. The input signal 102 ($x$) can be a time-domain signal or a single sub-band domain signal as e.g. obtained from a complex QMF bank. The signals output by the means 101, $y_1$-$y_N$ are the resulting de-correlated signals that are all mutually orthogonal or close to orthogonal.

As it is vital for reconstructing the spatial properties of a parametric stereo or parametric multi-channel system to decrease the coherence between two or more channels in order to reconstruct the perceived wideness of the spatial image, the resulting de-correlated signal can be used to create a final upmix of a multi-channel signal. This can be done by adding filtered versions (h1($x$)) of the original signal (x) to the output channels. Hence, lowering the coherence between N signals using N different filters can be done according to:

$$y1=a*x+b*h1(x)$$

$$y2=a*x+b*h2(x)$$

$$yn=a*x+b*hn(x)$$

where x is the original signal, y1 to yn are the resulting output signals, a and b are the gain factors controlling the amount of coherence and h1 to hn are the different decorrelation filters. In a more general sense, one can write the output signals $y_i$ (i=1 . . . I) as a linear combination of the input signal x and the input signal x filtered by filters $h_n$ (j=1 . . . N):

$$Y = \begin{pmatrix} y_1 \\ \vdots \\ y_I \end{pmatrix} = D\begin{pmatrix} x \\ h_1(x) \\ \vdots \\ h_N(x) \end{pmatrix}$$

Here, the mixing matrix D determines the mutual correlations and output levels of the output signals $y_i$.

In order to prevent changes in the timbre, the filter in question should preferably be of all-pass character. One successful approach is to use all-pass filters similar to those used for artificial reverberation processes. Artificial reverberation algorithms usually require a high time resolution to provide an impulse response that is satisfactory diffuse in time. One way of designing such all-pass filters is to use a random noise sequence as impulse response. The filter can then easily be implemented as an FIR filter. In order to achieve a sufficient degree of independence between the filtered outputs, the impulse response of the FIR filter should be relatively long, hence requiring a significant amount of computational effort to perform the convolution. An all-pass IIR filter is preferred for that purpose. The IIR structure has several advantages when it comes to designing de-correlation filters:

a) The natural exponential decay that is common for all natural reverberation is desired for a de-correlation filter. This is an inherent property of IIR filters.

b) For long decaying impulse responses of an IIR filter, the corresponding FIR filter is generally more expensive in terms of complexity and requires more memory.

However, designing IIR all-pass filters is less trivial than the FIR case where any random noise sequence qualifies as a coefficient vector. A design constraint when targeting multiple de-correlation filters is also the required ability to preserve the same decaying properties for all the filters while providing orthogonal outputs (i.e., a filter impulse responses that obey mutually substantially low correlation) of each filter output. Also as a basic requirement—stability has to be achieved.

The present invention shows a novel method to create multiple orthogonal all-pass filters by means of a lattice IIR filter structure. This approach has several advantages:

a) Lower complexity than FIR filters (given the required length of the impulse responses).

b) Stability constraints can be satisfied easily, as this is automatically achieved when absolute values of the magnitudes of all reflection coefficients are less than one.

c) Multiple orthogonal all-pass filters can be designed more easily with the same decaying properties based on random noise sequences.

d) High robustness against quantization errors due to finite word-length effects.

Although the reflection coefficients of the lattice IIR filter can be based on random noise sequences, for better performance those coefficients should also be sorted in more sophisticated ways or processed by non-random methods in order to achieve sufficient orthogonality and other important properties. A straightforward method is to generate a multitude of random reflection coefficient vectors, followed by a selection of a specific set based on certain criteria, such as a common decaying envelope, minimization of all mutual impulse response correlations of the selected set, and alike.

More specifically, one could start with a large set of random noise sequences. Each of these sequences is used as reflection coefficients in the allpass section. Subsequently, the impulse response of the resulting allpass section is computed for each random noise sequence. Finally, one selects those noise sequences that give mutually decorrelated impulse responses.

There are great advantages in basing the de-correlation algorithm on a (complex) filter bank such as the complex valued QMF bank. This filter bank provides the flexibility to allow the properties of the de-correlator to be frequency selective in terms of for example equalization, decay time, impulse density and timbre. Note that many of these properties can be altered while preserving the all-pass characteristic. There is much knowledge related to auditory perception that guides the design of such lattice IIR filter. An important aspect is the length and shape of the decaying envelop of the impulse response. Also the need for an additional pre-delay, optionally frequency dependent, is important as this largely influences what kind of comb-filter characteristic will be obtained when mixing the de-correlated signal with the original one. For sufficient impulse density the noise based reflection coefficients in the lattice filter should preferably be different for the different filter bank channels. For even better impulse density fractional delay approximations can be used within the filter bank.

Figure 2:
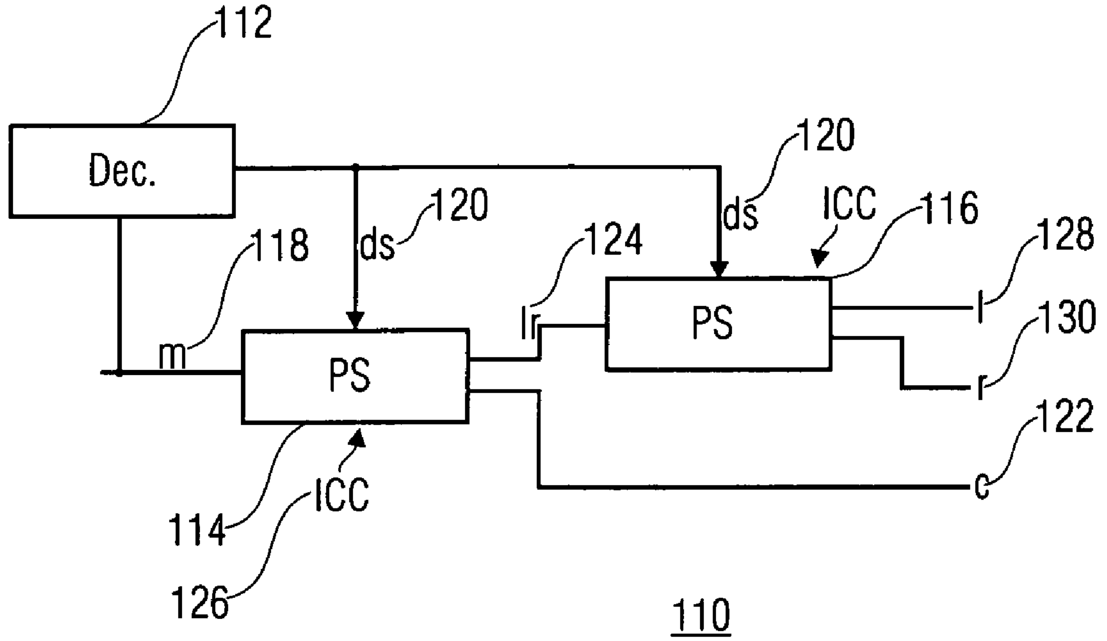
FIG. 2 shows a prior art decoder not implementing the inventive concepts.

FIG. 2 shows a hierarchical decoding structure to derive a multi-channel signal for a transmitted monophonic downmix signal by subsequent parametric stereo boxes, using a single decorrelated signal. By shortly reviewing the prior art approach, the problem solved by the present invention shall again be motivated. The 1-to-3 channel decoder 110 shown in FIG. 2 comprises a de-correlator 112, a first parametric stereo upmixer 114 and a second parametric stereo upmixer 116.

A monophonic input signal 118 is input into the de-correlator 112 to derive a de-correlated signal 120. Only a single de-correlated signal is derived. The first parametric stereo upmixer receives as an input the monophonic downmix signal 118 and the de-correlated signal 120. The first up-mixer 114 derives a center channel 122 and a combined channel 124 by mixing the monophonic downmix signal 118 and the de-correlated signal 120 using a correlation parameter 126, that steers the mixing of the channels.

The combined channel 124 is then input into the second parametric stereo upmixer 116, building the second hierarchical level of the audio decoder. The second parametric stereo up-mixer 116 is further receiving the de-correlated signal 120 as an input and derives a left channel 128 and a right channel 130 by mixing the combined channel 124 and the de-correlated signal 120.

It is principally feasible to generate a center channel 122 that is perfectly de-correlated from the combined channel 124, when the de-correlator 112 is able to derive a de-correlated signal which is fully orthogonal to the monophonic downmix signal 118. Almost perfect de-correlation would be achieved when the steering information 126 indicates an upmix, in which each upmixed channel is mainly having a signal component coming from either the de-correlated signal 120 or from the monophonic downmix signal 118. Since, however, the same de-correlated signal 120 is then used to derive the left channel 128 and the right channel 130, it is obvious, that this will result in a remaining correlation between the center channel 122 and one of the channels 128 or 130.

This becomes even more evident when examining the extreme case in which a completely de-correlated left channel 128 and right channel 130 shall be derived from a de-correlated signal 120 that is assumed to be perfectly orthogonal to the monophonic downmix signal. Perfect decorrelation between the left channel 128 and the right channel 130 can be achieved, when the combined channel 124 holds information on the monophonic downmix channel 118 only, which simultaneously means that the center channel 122 is mainly comprising the de-correlated signal 112. Therefore, a de-correlated left channel 128 and right channel 130 would mean that one of the channels does mainly comprise the information on the de-correlated signal 120 and the other channel would mainly comprise the combined signal 124, which then is identical to the monophonic downmix signal 118. Therefore the only way the left or the right channels are completely de-correlated forces an almost perfect correlation between the center channel 122 and one of the channels 128 or 130.

This most unwanted property can be successfully avoided by applying the inventive concept of generating different and mutually orthogonal de-correlated signals.

Figure 3:
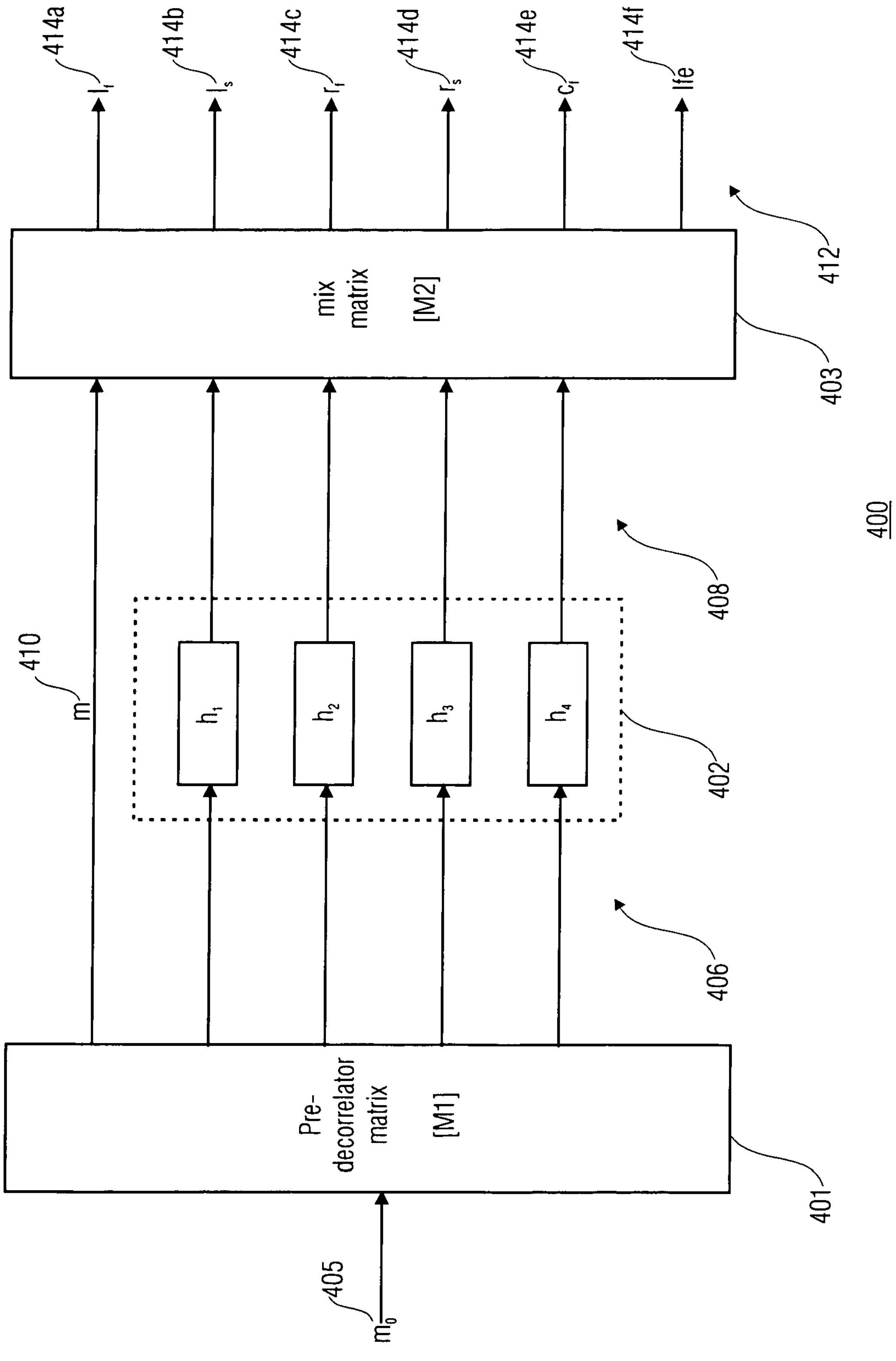
FIG. 3 shows a 5.1 multi-channel audio decoder according to the present invention.

FIG. 3 shows an embodiment of an inventive multi-channel audio decoder 400 comprising a pre-de-correlator matrix 401, a de-correlator 402 and a mix-matrix 403. The inventive decoder 400 shows a 1-to-5 configuration, where five audio channels and a low-frequency enhancement channel are derived from a monophonic downmix signal 405 and additional spatial control data, such as ICC or ICLD parameters. These are not shown in the principle sketch in FIG. 3. The monophonic downmix signal 405 is input into the pre-de-correlator matrix 401 that derives four intermediate signals 406 which serve as an input for the de-correlator 402, that is comprising four inventive de-correlators $h_1$-$h_4$. These are supplying four mutually orthogonal de-correlated signals 408 at the output of the de-correlator 402.

The mix-matrix 403 receives as an input the four mutually orthogonal de-correlated signals 408 and in addition a downmix signal 410 derived from the monophonic downmix signal 405 by the pre-de-correlator matrix 401.

The mix-matrix 403 combines the monophonic signal 410 and the four de-correlated signals 408 to yield a 5.1 output signal 412 comprising a left-front channel **414*a*, a left-surround channel 414*b*, a right-front channel 414*c*, a right-surround channel 414*d*, a center channel 414*e* and a low-frequency enhancement channel 414*f***.

It is important to note that the generation of four mutually orthogonal de-correlated signals 408 enables the ability to derive five channels of the 5.1 channel signal that are at least partly de-correlated. In a preferred embodiment of the present invention, these are the channels **414*a* to 414*e*. The low-frequency enhancement channel 414*f* comprises low-frequency parts of the multi-channel signal, that are combined in one single low-frequency channel for all the surround channels 414*a* to 414*e***.

Figure 4:
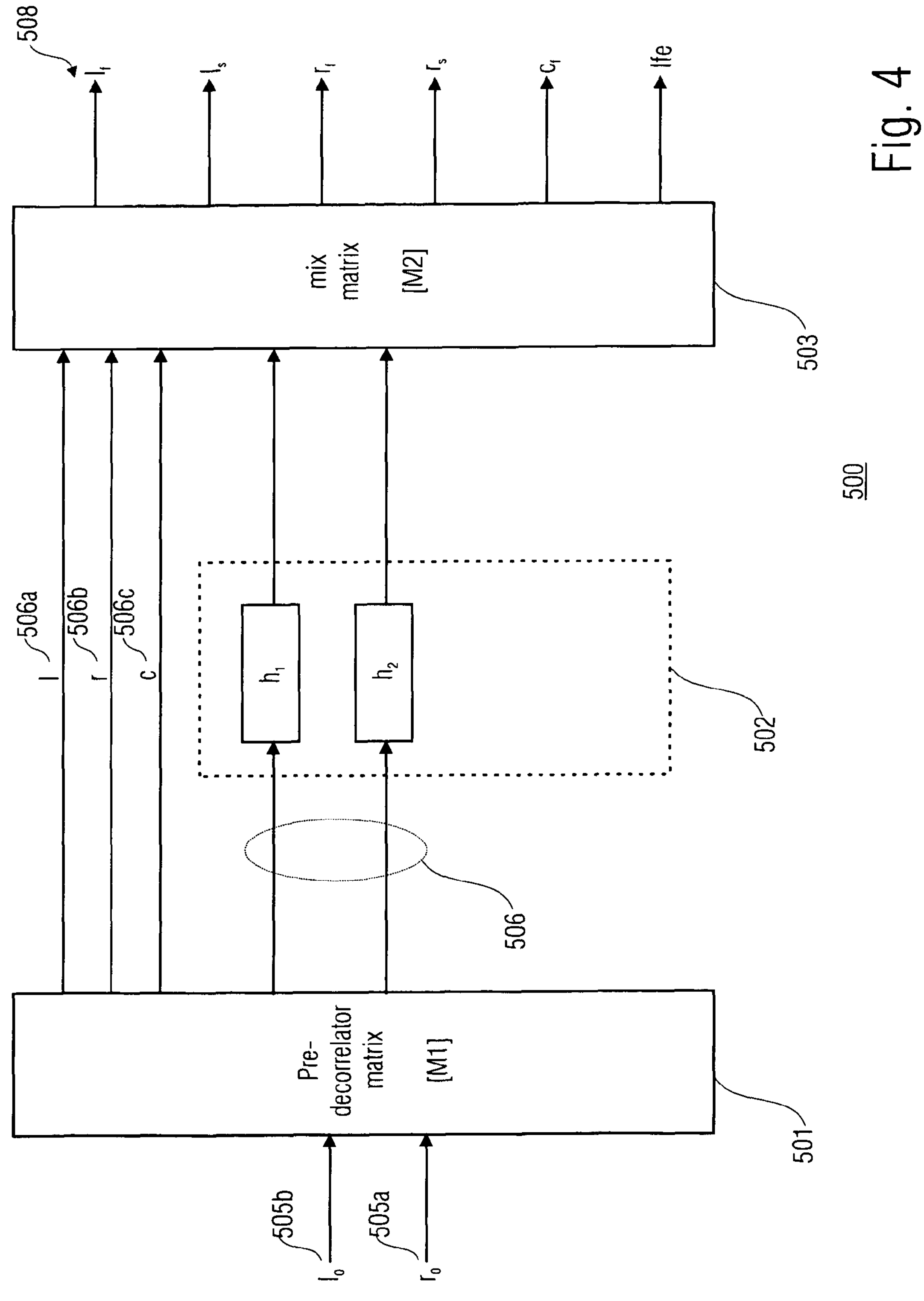
FIG. 4 shows a further 5.1 channel audio decoder according to the present invention.

FIG. 4 shows an inventive 2-to-5 decoder to derive a 5.1 channel surround signal from two transmitted signals.

The multi-channel audio decoder 500 comprises a pre-de-correlator matrix 501, a de-correlator 502 and a mix-matrix 503. In the 2-to-5 setup, two transmitted channels, **505*a* and 505*b* are input into the pre-de-correlator matrix that derives an intermediate left channel 506*a*, an intermediate right channel 506*b* and an intermediate center channel 506*c* and two intermediate channels 506*d* from the submitted channels 505*a* and 505*b***, optionally also using additional control data such as ICC and ICLD parameters.

The intermediate channels **506*d* are used as input for the de-correlator 502 that derives two mutually orthogonal or nearly orthogonal de-correlated signals which are input into the mix-matrix 503 together with the intermediate left channel 506*a*, the intermediate right channel 506*b* and the intermediate center channel 506*c***.

The mix-matrix 503 derives the final 5.1 channel audio signal 508 from the previously mentioned signals, wherein the finally derived audio channels have the same advantageous properties as already described for the channels derived by the 1-to-5 multi-channel audio decoder 400.

Figure 5:
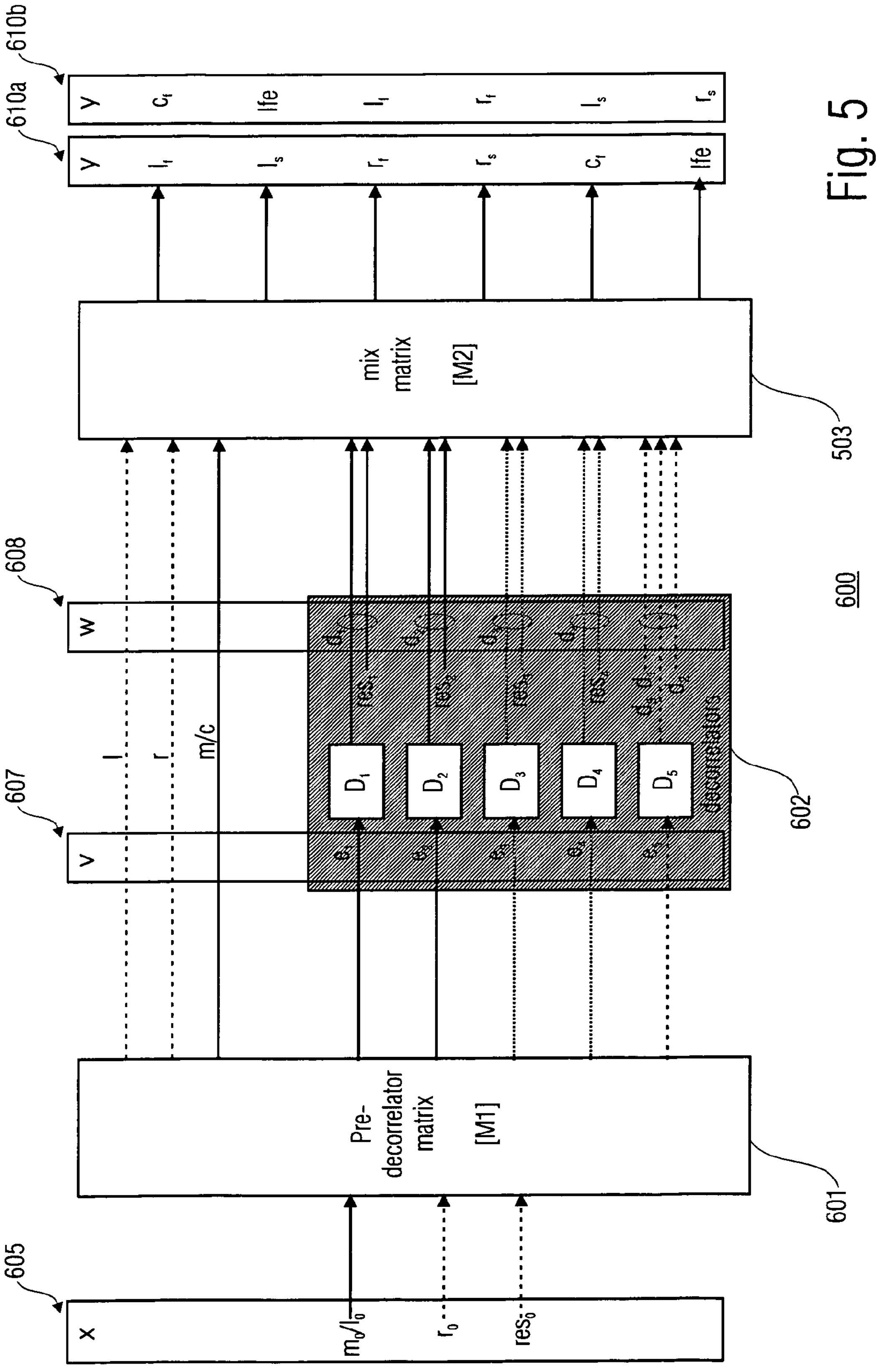
FIG. 5 shows a further inventive audio decoder.

FIG. 5 shows a further embodiment of the present invention, that combines the features of multi-channel audio decoders 400 and 500. The multi-channel audio decoder 600 comprises a pre-de-correlation matrix 601, a de-correlator 602 and a mix-matrix 603. The multi-channel audio decoder 600 is a flexible device allowing to operate in different modes depending on the configuration of input signals 605 input into the pre-de-correlator 601. Generally, the pre-de-correlator derives intermediate signals 607 that serve as input for the de-correlator 602 and that are partially transmitted and altered to build input parameters 608. The input parameters 608 are the parameters input into the mix-matrix 603 that derives output channel configurations **610*a* or 610*b*** depending on the input channel configuration.

In a 1-to-5 configuration, a downmix signal and an optional residual signal is supplied to the pre-de-correlator matrix, that derives four intermediate signals ($e_1$ to $e_4$) that are used as an input of the de-correlator, which derives four de-correlated signals ($d_1$, to $d_4$) that form the input parameters 608 together with a directly transmitted signal m derived from the input signal.

It may be noted, that in the case where an additional residual signal is supplied as input, the de-correlator 602 that is generally operative in a sub-band domain, may be operative to forward the residual signal instead of deriving a de-correlated signal. This may also be done in a selective manner for certain frequency bands only.

In the 2-to-5 configuration the input signals 605 comprise a left channel, a right channel and optionally a residual signal. In that configuration, the pre-de-correlator matrix derives a left, a right and a center channel and in addition two intermediate channels ($e_1$, $e_2$). Hence, the input parameters to the mix-matrix 603 are formed by the left channel, the right channel, the center channel, and two de-correlated signals ($d_1$ and $d_2$). In a further modification, the pre-de-correlator matrix may derive an additional intermediate signal ($e_5$) that is used as an input for a de-correlator ($D_5$) whose output is a combination of the de-correlated signal ($d_5$) derived from the signal ($e_5$) and the de-correlated signals ($d_1$ and $d_2$). In this case, an additional de-correlation can be guaranteed between the center channel and the left and the right channel.

Figure 6:
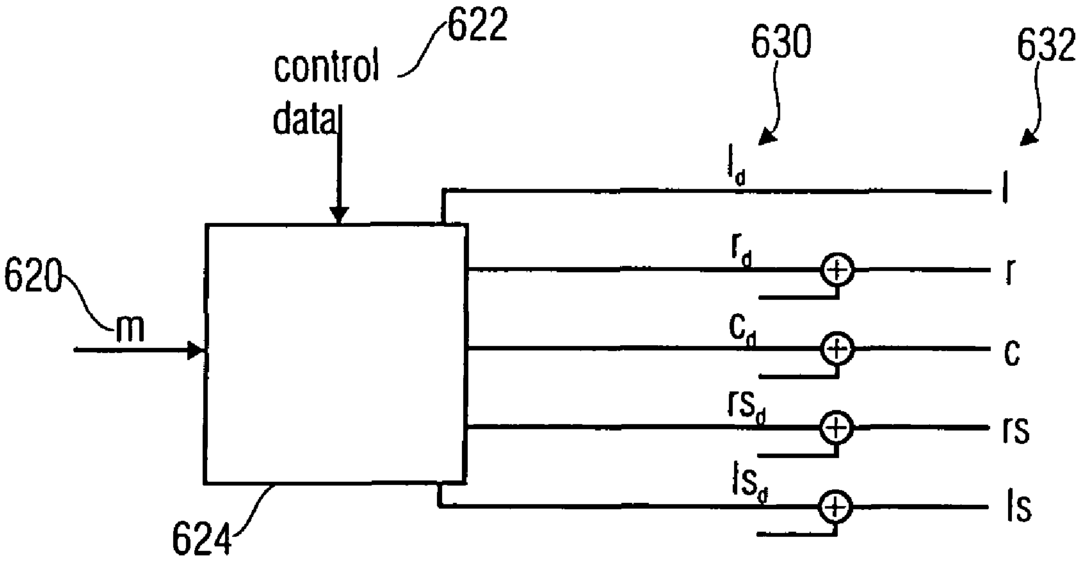
FIG. 6 shows a further embodiment of an inventive multi-channel audio decoder.

FIG. 6 shows a further embodiment of the present invention, in which de-correlated signals are combined with individual audio channels after the upmixing process. In this alternative embodiment, a monophonic audio channel 620 is upmixed by an upmixer 624, wherein the upmixing may be controlled by additional control data 622. The upmix channels 630 comprise five audio channels that are correlated with each other, and commonly referred to as dry channels. Final channels 632 can be derived by combining four of the dry channels 630 with de-correlated, mutually orthogonal signals. As a result, it is possible to provide five channels that are at least partly de-correlated from each other. With respect to FIG. 3, this can be seen as a special case of a mix-matrix.

Figure 7:
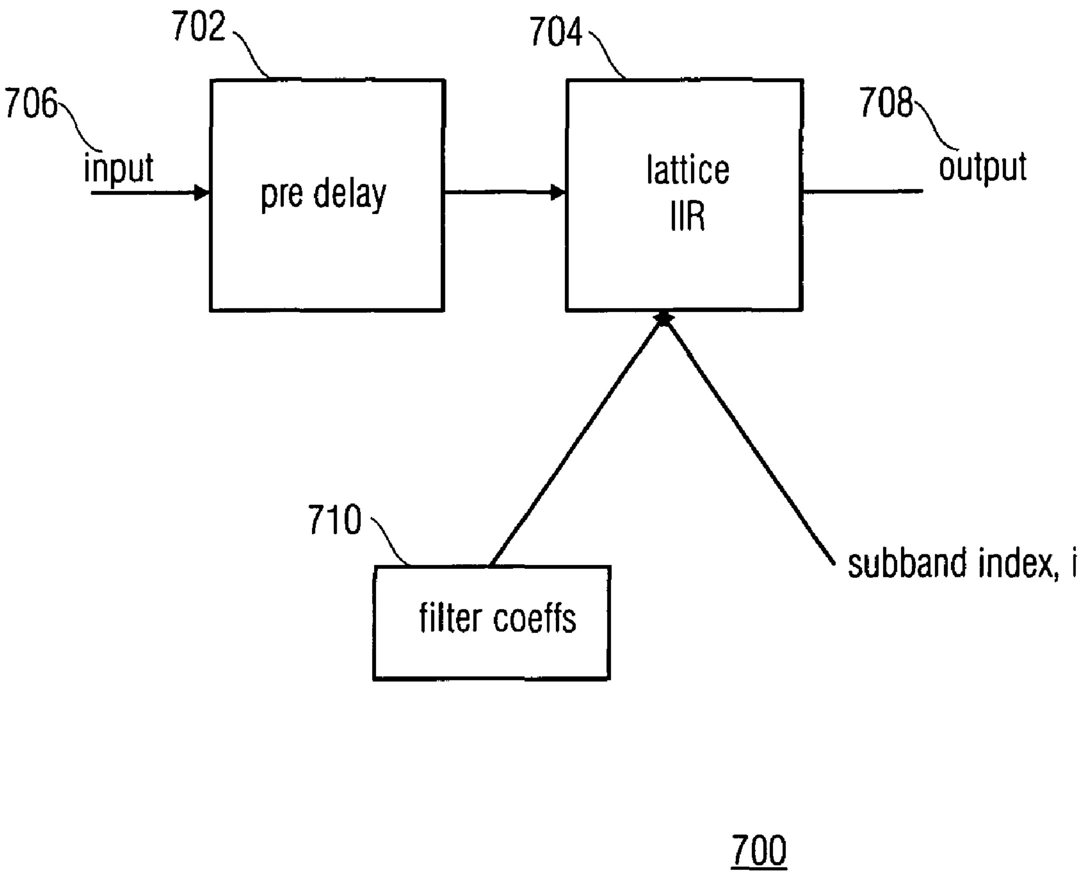
FIG. 7 shows schematically the generation of a de-correlated signal.

FIG. 7 shows a block diagram of an inventive de-correlator 700 for providing a de-correlated signal. The de-correlator 700 comprises a predelay unit 702 and a de-correlation unit 704.

An input signal 706 is input into the predelay unit 702 for delaying the signal 706 for a predetermined time. The output from the predelay unit 702 is connected to the de-correlation unit 704 to derive a de-correlated signal 708 as an output of the de-correlator 700.

In a preferred embodiment of the present invention, the de-correlation unit 704 comprises a lattice IIR all-pass filter. In an optional variation of the de-correlator 700, the filter coefficients (reflection coefficients) are input to the de-correlation unit 704 by means of an provider of filter coefficients 710. When the inventive de-correlator 700 is operated within a filtering sub-band (e.g. within a QMF filter-bank), the sub-band index of the currently processed sub-band signal may additionally be input into the de-correlation unit 704. In that case, in a further modification of the present invention, different filter coefficients of the de-correlation unit 704 may be applied or calculated based on the sub-band index provided.

Figure 8:
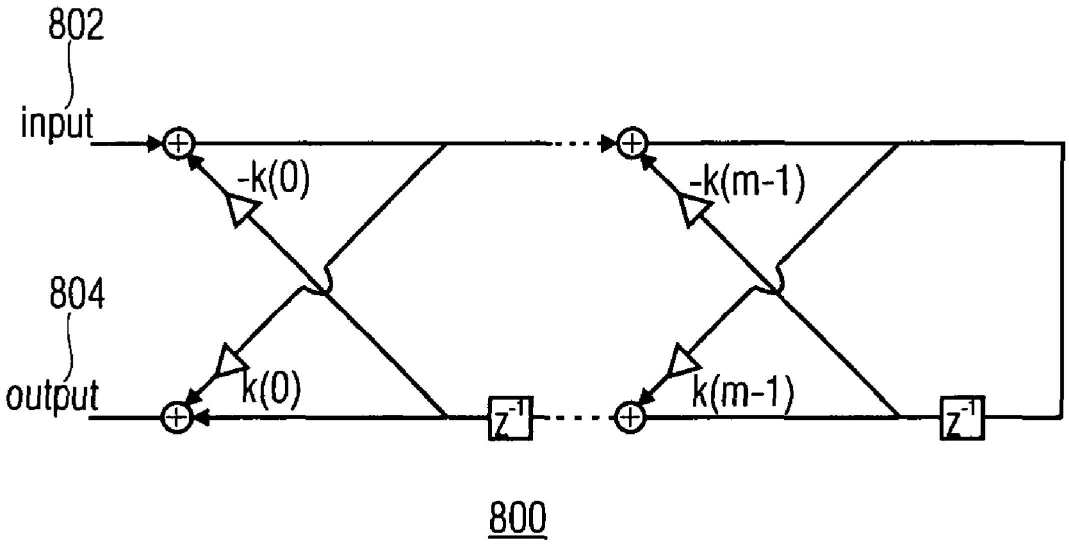
FIG. 8 shows a lattice IIR filter used for generating a de-correlated signal.

FIG. 8 shows a lattice IIR filter as preferably used to generate the de-correlated signals.

The IIR filter 800 shown in FIG. 8 receives as an input an audio signal 802 and derives as an output 804 a de-correlated version of the input signal. A big advantage using an IIR lattice filter is, that the exponentially decaying impulse response required to derive an appropriate de-correlated signal comes at no additional costs, since this is an inherent property of the lattice IIR filter. It is to be noted, that it is necessary to have filter coefficients $k(0)$ to $k(M-1)$ whose absolute values are smaller than unity to achieve the required stability of the filter. Additionally, multiple orthogonal all-pass filters can be designed more easily based on lattice IIR filters which is a major advantage for the inventive concept of deriving multiple de-correlated signals from a single input signal, wherein the different derived de-correlated signals shall be almost perfectly de-correlated or orthogonal to one another.

More details on the design and the properties of all-pass lattice filters may be found in "Adaptive Filter Theory", Simon Haykin, ISBN 0-13-090126-1, Prentice-Hall, 2002.

Figure 9:
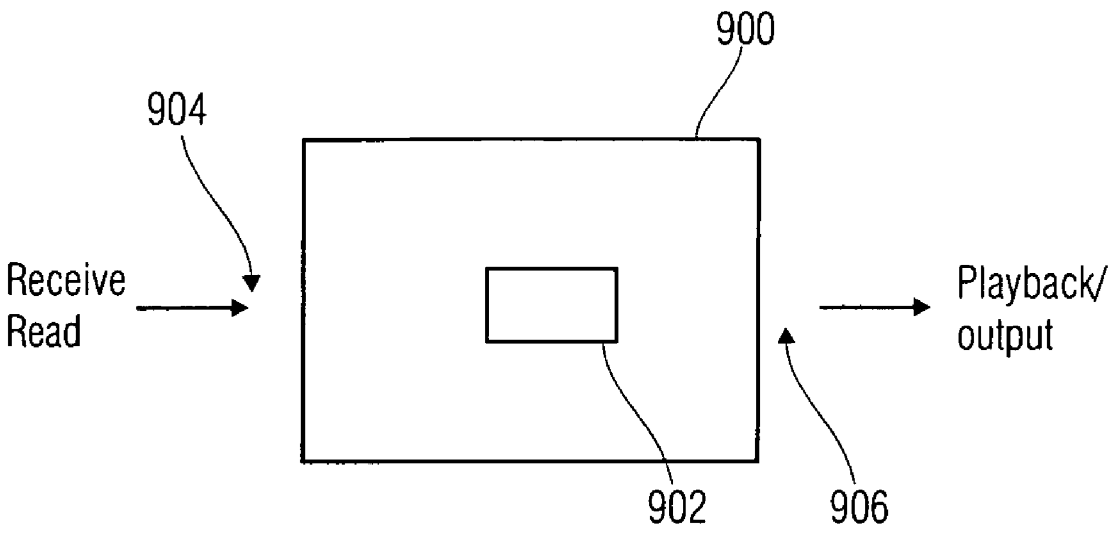
FIG. 9 shows a receiver or audio player having an inventive audio decoder.

FIG. 9 shows an inventive receiver or audio player 900, having an inventive audio decoder 902, a bit stream input 904, and an audio output 906.

A bit stream can be input at the input 904 of the inventive receiver/audio player 900. The bit stream then is decoded by the decoder 902 and the decoded signal is output or played at the output 906 of the inventive receiver/audio player 900.

Figure 10:
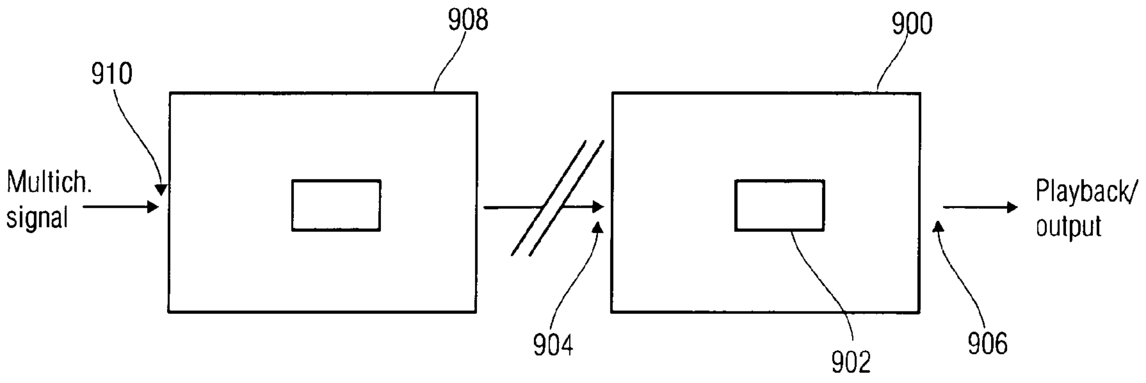
FIG. 10 shows a transmission having a receiver or playback device having an inventive audio decoder.

FIG. 10 shows a transmission system comprising a transmitter 908 and an inventive receiver 900.

The audio signal input at an input interface 910 of the transmitter 908 is encoded and transferred from the output of the transmitter 908 to the input 904 of the receiver 900. The receiver decodes the audio signal and plays back or outputs the audio signal on its output 906.

The present invention relates to coding of multi-channel representations of audio signals using spatial parameters. The present invention teaches new methods for de-correlating signals in order to lower the coherence between the output channels. It goes without saying that although the new concept to create multiple de-correlated signals is extremely advantageous in an inventive audio decoder, the inventive concept may also be used in any other technical field that requires the efficient generation of such signals.

Although the present invention has been detailed within multi-channel audio decoder that are performing an upmix in a single upmixing step, the present invention may of course also be incorporated in audio decoders that are based on a hierarchical decoding structure, such as for example shown in FIG. 2.

Although the previously described embodiments mostly describe the derivation of decorrelated signals from a single downmix signal, it goes without saying that also more than one audio channel may be used as input for the decorrelators or the pre-decorrelation-matrix, i.e. that the downmix signal may comprise more than one downmixed audio channel.

Furthermore, the number of de-correlated signal derived from a single input signal is basically un-limited, since the filter order of lattice filters can be varied without limitation and, since it is possible to find a new set of filter coefficients deriving a de-correlated signal being orthogonal or mainly orthogonal to other signals in the set.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Multi-channel decoder for generating a reconstruction of a multi-channel signal using a downmix signal derived from an original multi-channel signal, the reconstruction of the multi-channel signal having at least three channels, comprising:

a de-correlator for deriving a set of de-correlated signals using a de-correlation rule, wherein the de-correlation rule is such that a first de-correlated signal and a second de-correlated signal are derived from the downmix signal, the downmix signal being a single sub-band domain signal, and that the first de-correlated signal and the second de-correlated signal are orthogonal to each other within an orthogonality tolerance range; and an output channel calculator for generating the at least three channels from the downmix signal, the downmix signal being a single sub-band domain signal, and using the first and the second de-correlated signals and upmix information so that the at least three channels are at least partly de-correlated from each other and different from the downmix signal, the first and the second de-correlated signals.

2. Multi-channel decoder in accordance with claim 1 in which the de-correlation rule is such that the orthogonality tolerance range includes orthogonality values <0.5 when an orthogonality value of 0 indicates perfect orthogonality and an orthogonality value of 1 indicates perfect correlation.

3. Multi-channel decoder in accordance with claim 1, in which the decoding rule is such that the deriving of the first and second de-correlated signals comprises filtering of an audio channel extracted from the downmix signal by means of an IIR filter.

4. Multi-channel decoder in accordance with claim 3, in which the IIR filter is a lattice filter based on a lattice structure having an all-pass filter characteristic.

5. Multi-channel decoder in accordance with claim 3, in which the IIR filter is having a first adder in a forward prediction path of the filter for adding an actual portion of the audio channel and a previous portion of the audio channel which is weighted with a first weighing factor; and a second adder in a backward prediction path for adding the previous portion of the audio channel to the actual portion which is weighted with a second weighing factor of the audio signal; and wherein the absolute values of the first and the second weighting factors are equal.

6. Multi-channel decoder in accordance with claim 5, in which the IIR filter is operative to use a first and a second weighting factor that are derived from random noise sequences.

7. Multi-channel decoder in accordance with claim 1, in which the de-correlation rule is such that the first de-correlated signal and the second de-correlated signal are derived using a time delayed version of the downmix signal.

8. Multi-channel decoder in accordance with claim 1, in which the decoding rule is such that the first and the second de-correlated signals are derived using a portion of the downmix signal derived from the downmix signal by a real or complex-valued filterbank.

9. Multi-channel decoder in accordance with claim 3, further comprising a channel decomposer to derive the audio channel from the downmix signal using a deriving rule.

10. Multi-channel decoder in accordance with claim 9, in which the deriving rule is such that four channels are derived from the downmix signal, wherein the downmix signal is having information on one original channel.

11. Multi-channel decoder in accordance with claim 9, in which the deriving rule is such that two channels are derived from the downmix signal, wherein the downmix signal is having information on two original channels.

12. Multi-channel decoder in accordance with claim 1, in which the output channel calculator is operative to generate five output channels from a downmix signal having information on one audio channel and from four de-correlated signals.

13. Multi-channel decoder in accordance with claim 1, in which the output channel calculator is operative to generate five output channels from the downmix signal having information on two audio channels and from two de-correlated signals.

14. Multi-channel decoder in accordance with claim 1, in which the output channel calculator is operative to use upmixed information comprising at least one parameter indicating a desired correlation of a first and a second output channel.

15. Method of generating a reconstruction of a multi-channel signal using a downmix signal derived from an original multi-channel signal, the reconstruction of the multi-channel signal having at least three channels, the method comprising:

deriving a set of de-correlated signals using a de-correlation rule, wherein the de-correlation rule is such that the first de-correlated signal and the second de-correlated signal are derived from the downmix signal, the downmix signal being a single sub-band domain signal, and that the first de-correlated signal and the second de-correlated signal are orthogonal to each other within an orthogonality tolerance range; and generating the at least three channels from the downmix signal, the downmix signal being a single sub-band domain signal, and using the first and the second de-correlation signals and upmix information so that the at least three channels are at least partly de-correlated from each other and different from the downmix signal, the first and the second de-correlated signals.

16. Receiver or audio player, the receiver or audio player having a multi-channel decoder for generating a reconstruction of a multi-channel signal using a downmix signal derived from an original multi-channel signal, the reconstruction of the multi-channel signal having at least three channels, comprising:

a de-correlator for deriving a set of de-correlated signals using a de-correlation rule, wherein the de-correlation rule is such that a first de-correlated signal and a second de-correlated signal are derived from the downmix signal, the downmix signal being a single sub-band domain signal, and that the first de-correlated signal and the second de-correlated signal are orthogonal to each other within an orthogonality tolerance range; and an output channel calculator for generating the at least three channels from the downmix signal, the downmix signal being a single sub-band domain signal, and using the first and the second de-correlated signals and upmix information so that the at least three channels are at least partly de-correlated from each other and different from the downmix signal, the first and the second de-correlated signals.

17. Method of receiving or audio playing, the method having a method for generating a reconstruction of a multi-channel signal using a downmix signal derived from an original multi-channel signal, the reconstruction of the multi-channel signal having at least three channels, the method comprising:

deriving a set of de-correlated signals using a de-correlation rule, wherein the de-correlation rule is such that the first de-correlated signal and the second de-correlated signal are derived from the downmix signal, the downmix signal being a single sub-band domain signal, and that the first de-correlated signal and the second de-correlated signal are orthogonal to each other within an orthogonality tolerance range; and generating the at least three channels from the downmix signal, the downmix signal being a single sub-band domain signal, and using the first and the second de-correlation signals and upmix information so that the at least three channels are at least partly de-correlated from each other and different from the downmix signal, the first and the second de-correlated signals.

18. Computer program product comprising program code stored on a computer readable medium for performing, when running on a computer, a method of generating a reconstruction of a multi-channel signal using a downmix signal derived from an original multi-channel signal, the reconstruction of the multi-channel signal having at least three channels, the method comprising:

deriving a set of de-correlated signals using a de-correlation rule, wherein the de-correlation rule is such that the first de-correlated signal and the second de-correlated signal are derived from the downmix signal, the downmix signal being a single sub-band domain signal, and that the first de-correlated signal and the second de-correlated signal are orthogonal to each other within an orthogonality tolerance range; and generating the at least three channels from the downmix signal, the downmix signal being a single sub-band domain signal, and using the first and the second de-correlation signals and upmix information so that the at least three channels are at least partly de-correlated from each other and different from the downmix signal, the first and the second de-correlated signals.

19. Computer program product comprising program code stored on a computer readable medium for performing, when running on a computer, a method of receiving or audio playing, the method having a method for generating a reconstruction of a multi-channel signal using a downmix signal derived from an original multi-channel signal, the reconstruction of the multi-channel signal having at least three channels, the method comprising:

deriving a set of de-correlated signals using a de-correlation rule, wherein the de-correlation rule is such that the first de-correlated signal and the second de-correlated signal are derived from the downmix signal, the downmix signal being a single sub-band domain signal, and that the first de-correlated signal and the second de-correlated signal are orthogonal to each other within an orthogonality tolerance range; and generating the at least three channels from the downmix signal, the downmix signal being a single sub-band domain signal, and using the first and the second de-correlation signals and upmix information so that the at least three channels are at least partly de-correlated from each other and different from the downmix signal, the first and the second de-correlated signals.

* * * * *